United States Patent [19]

Kupelian

[11] 3,873,297

[45] Mar. 25, 1975

[54] PROCESS FOR INHIBITING BUD GROWTH
[75] Inventor: Robert Howard Kupelian, Yardley, Pa.
[73] Assignee: American Cyanamid Company, Stamford, Conn.
[22] Filed: Feb. 28, 1973
[21] Appl. No.: 336,643

[52] U.S. Cl. .................................. 71/78, 71/92
[51] Int. Cl. .................................................. A01n
[58] Field of Search .............................. 71/78, 76

[56] References Cited
UNITED STATES PATENTS
3,485,917  12/1969  Godefroi et al. ................. 424/273

Primary Examiner—James O. Thomas, Jr.
Attorney, Agent, or Firm—Harry H. Kline

[57] ABSTRACT

There is provided a method for inhibiting bud growth on plants, trees and harvested bulbs and tubers comprising contacting said plants, trees or harvested bulbs and tubers with a bud growth inhibiting amount of a lower alkyl ester of 1-(1,2,3,4-tetrahydro-1-naphthyl)-5-imidazolecarboxylic acid or the acid addition salt thereof.

10 Claims, No Drawings

PROCESS FOR INHIBITING BUD GROWTH

The present invention relates to a novel method for regulating the growth of living plants and/or inhibiting the development of terminal, basal, adventitious or axillary buds thereon by applying to said plants an effective amount of a lower alkyl ester of 1-(1,2,3,4-tetrahydro-1-naphthyl)-5-imidazolecarboxylic acid or an acid addition salt thereof. More particularly, the invention relates to a method for inhibiting growth of axillary buds on tobacco plants, terminal and adventitious buds on harvested potatoes and onions, and adventitious buds on fruit and nut trees by applying thereto a bud growth inhibiting amount of the lower alkyl ester of 1-(1,2,3,4-tetrahydro-1-naphthyl)-5-imidazolecarboxylic acid or an acid addition salt thereof.

It is known that, although virtually all white potatoes and onions, for instance, are presently treated with sprout-inhibiting chemicals, such as maleic hydrazide, isopropyl N-(3-chlorophenyl)carbamate or like material, it is apparent to the consumer and industry alike that more effective methods for inhibiting sprouting on such products are desirable. It is also recognized that, should biological or toxicological studies render one or more of the commonly used materials suspect and raise a question as to the desirability of using the same in treatment of products destined for ingestion or contact by the consumer, withdrawal of such treated material from the market place could be essentially instantaneous. In this event, the farmers' ability to continue supplying potatoes and onions of the quality demanded by the public could be seriously hindered. Thus, a variety of axillary and bud inhibiting chemicals have been tested, but none has been found to be wholly satisfactory. Therefore, if a safe, effective material could be developed which would provide a practical level of sucker and/or sprout control without adversely affecting the quality of the product, such material would satisfy a long felt need in the art.

It is, therefore, a principal object of the invention to provide a safe and efficient method for applying an inhibiting chemical of the class hereinbelow set forth to virtually any and all crops. It is a further object of the invention to apply rather small non-polluting quantities of an inhibiting chemical to affect bud growth of plants. These and other objects and advantages will become apparent from a reading of the ensuing description.

To this end it has been surprisingly found that active ingredients, namely, the lower alkyl esters of 1-(1,2,3,4-tetrahydro-1-naphthyl)-5-imidazolecarboxylic acid and the acid addition salts thereof, inhibit axillary and terminal bud development on harvested vegetables at markedly low rates of application.

Advantageously, the preparation of the inhibiting compounds of the present invention can be achieved in accordance with the teaching of Godefroi et al. in U.S. Pat. No. 3,485,917, issued Dec. 23, 1969 and incorporated herein by reference. Thus, the lower alkyl esters of 1-(1,2,3,4-tetrahydro-1-naphthyl)-5-imidazolecarboxylic acid and addition salts thereof include the methyl, ethyl, n-propyl, isopropyl and butyl esters of which the ethyl ester is preferred. Moreover, acid addition salts thereof which also may be used in accordance with the present invention are the hydrochloride, nitrate, gluconate, oxalate, acetate and citrate. However, the free base, hydrochloride, gluconate and acetate are preferred.

The method for inhibiting growth of axillary buds on tobacco plants, for instance, involves treating topped tobacco plants prior to harvesting of the marketable leaves. Generally, the flower stalk of the plant is cut when approximately 75 percent of the plants in a plot are in bloom. This usually occurs about 60 days after transplanting, or about 1 to 8 weeks before harvest, depending upon the weather conditions encountered, fertilization and soil conditions. After the plants have been topped, a liquid spray containing the active ingredient in an amount sufficient to provide from about 0.1 pound to 6 pounds per acre and, preferably from 0.3 pounds to 3.0 pounds per acre of active ingredient, is applied to the topped plants.

In practice, it has been found that aqueous sprays, e.g. suspensions and solutions, containing from 100 ppm to 2,000 ppm of the active compound are effective for inhibiting axillary bud growth on flue-cured and burley tobaccos. Moreover, it is found that plants so treated are virtually free of leaf burn or other signs of phytotoxicity.

Harvesting of the marketable or prime leaves of flue-cured tobacco is usually begun about 1 to 2 weeks after treatment and may continue for 4 or 5 weeks. Usually, the leaves are cut from the bottom of the stalk in groups of three at weekly intervals. Inhibiting growth of axillary buds during this period is important since such treatment results in improved quality, texture, and yield of the prime or marketable leaves. Inhibiting growth of axillary buds on topped burley tobacco is also important from the standpoint of improving quality and yield of tobacco; however, the harvesting procedure is somewhat different. It involves topping the burley plants, spraying said topped plants with a solution of the active material to inhibit bud development, and 5 to 10 weeks after treatment harvesting the entire stalk with the leaves intact.

Inhibiting development of adventitious buds on woody plants such as fruit and nut trees is achieved by a procedure which differs from both techniques heretofore described. This procedure involves applying an aqueous solution containing the active imidazolecarboxylic acid or acid salt thereof to the branches and trunks of dormant trees where inhibition of adventitious buds is desired. The trees are generally sprayed to run off with the prepared solution about 1 to 5 weeks before silver tips are expected to show, and the application is usually sufficient to provide about 1 to 10 pounds per acre of the active imidazolecarbocylic acid.

In practice we have found that it is generally preferable to formulate the active compound as a 25 to 75 percent wettable powder formulation which is dispersed in water at the site of use and applied to plants or trees as a liquid spray or to harvested vegetables as a spray or dip.

Wettable powder formulations useful in the practice of this invention can be prepared by grinding together from about 25 to 75 percent by weight of the active compound; about 15 to 65 percent of a finely divided solid carrier, such as attaclay, kaolin, diatomaceous earth or talc; about 2 to 5 percent by weight of a dispersant, such as sodium lignosulfonate; and from about 2 to 5 percent by weight of a surfactant. Illustrative wettable powder formulations, percentages being by weight, are as follows:

FIG. 1 is a schematic perspective view of an electrophotographic printing machine incorporating the features of the present invention therein;

FIG. 2 is a sectional elevational view of the photoconductive drum and the control apparatus employed in the FIG. 1 printing machine; and FIG. 3 is an electrical diagram depicting a portion of the electrical circuitry associated with the FIG. 2 control apparatus.

While the present invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

With continued reference to the drawings wherein like reference numerals have been used throughout to designate like elements, FIG. 1 schematically depicts a multi-color electrophotographic printing machine having the features of the present invention incorporated therein. The electrophotographic printing machine depicted in FIG. 1 shows the various components employed therein for producing multi-color copies from a colored original. Although the control system of the present apparatus is particularly well adapted for use in conjunction with the development system of the FIG. 1 electrophotographic printing machine, it should become evident from the following description that it is equally well-suited for use in a wide variety of electrostatographic printing machines and is not necessarily limited to the particular embodiment shown herein.

The printing machine depicted in FIG. 1 employs an image bearing member having a drum 10 mounted rotatably within the machine frame (not shown). Photoconductive surface 12 is secured to and entrained about the exterior circumferential surface of drum 10. Preferably, photoconductive surface 12 has a relatively panchromatic response to white light. One type of suitable photoconductive material is disclosed in U.S. Pat. No. 3,655,377 issued to Sechak in 1972. Drum 10 rotates in the direction of arrow 14 to move photoconductive surface 12 sequentially through a series of processing stations. A drive motor (not shown) rotates drum 10 at a predetermined speed relative to the other operating mechanism. Various machine operations are coordinated with one another to produce the proper sequence of events at the appropriate processing stations. The sequence of events within the printing machine is controlled by the machine logic circuitry. The logic timing may be keyed from individual logic elements, or, in lieu thereof, keyed to the angular rotation of drum 10. In the event that the timing of the various sequence of events is keyed to the angular rotation of drum 10, a timing disc (not shown) may be mounted in the region of one end portion of drum 10. Preferably, the timing disc includes a plurality of angularly spaced slits in the periphery thereof. A light source is adapted to transmit light rays through the foregoing slits and energize a photosensor. Thus, as the various slits permit the passage of light therethrough, the photosensor is actuated to energize the appropriate logic circuitry for initiating the various processes at the respective printing machine stations.

Initially, drum 10 moves photoconductive surface 12 to charging station A. At charging station A, a corona generating device, indicated generally at 16, extends in a generally logitudinal direction transversely across photoconductive surface 12. This enables corona generating device 16 to readily charge photoconductive surface 12 to a relatively high substantially uniform potential. One type of suitable corona generating device is described in U.S. Pat. No. 2,778,946 issued to Mayo in 1957.

Next, drum 10 is rotated to exposure station B where charged photoconductive surface 12 is exposed to a color filtered light image of the original document. Exposure station B includes thereat a moving lens system, generally designated by the reference numeral 18, and a color filter mechanism, shown generally at 20. A suitable moving lens system is disclosed in U.S. Pat. No. 3,062,108 issued to Mayo in 1962. As illustrated in FIG. 1, an original document 22, such as a sheet of paper, book, or the like is placed face down upon transparent viewing platen 24. Lamp assembly 26, lens system 18, and filter mechanism 20 are moved in a timed relationship with drum 10 to scan successive incremental areas of original document 22 disposed upon platen 24. In this way, the optical system creates a flowing light image of original document 22 which is projected onto charged photoconductive surface 12. The irradiated areas of charged photoconductive surface 12 are discharged to record an electrostatic latent image corresponding to original document 22 thereon. Filter mechanism 20 is adapted to interpose selected color filters into the optical light path. The appropriate color filter operates on the light rays passing through lens 18 creating a single color light image. The single color light image forms an electrostatic latent image on photoconductive surface 12 which corresponds to a preselected spectral region of the electromagnetic wave spectrum, hereinafter referred to as a single color electrostatic latent image.

Drum 10, with the single color electrostatic latent image recorded on photoconductive surface 12, is, thereafter, rotated to development station C. Three individual developer units, generally indicated by the reference numerals 28, 30 and 32, respectively, are disposed at development station C. A suitable development station employing a plurality of developer units is described in copending application Ser. No. 255,259, filed on May 22, 1972. Preferably, the developer units are all of a type referred to generally as magnetic brush developer units. A typical magnetic brush developer unit utilizes a magnetizable developer mix having carrier granules and toner particles. The developer mix is continually brought through a directional flux field to form a brush thereof. The electrostatic latent image recorded on photoconductive surface 12 is brought into contact therewith. Each of the respective developer units contain discretely colored toner particles corresponding to the complement of the spectral region of the wave length of light transmitted through filter 20, e.g., a green filtered electrostatic latent image is rendered visible with green absorbing magenta toner particles. Similarly, blue and red latent images are developed with yellow and cyan toner particles respectively. Each of the foregoing developer units contain its own supply of toner particles which are furnished to the developer mix as the concentration of toner particles therein is depleted beneath a pre-selected level as de- Similar results are obtained when substituting the methyl, propyl or butyl ester for the ethyl ester of the above noted imidazolecarboxylic acid.

EXAMPLE 2

In these tests field grown tobacco (flue-cured) is topped at about the 21st leaf when it reaches the early flowering state of plant development. 50 plants per treatment are used and each plant is sprayed with 20 parts of water containing 340 parts of test compound, hereinbelow defined. The compound is prepared as a 50 percent wettable powder which is dispersed in water for application. The wettable powder employed possesses the following formulation:
- 50 percent ethyl ester of 1-(1,2,3,4-tetrahydro-1-naphthyl)-5-imidazolecarboxylic acid as the nitrate salt,
- 2 percent nonylphenyl-ethylene oxide,
- 4 percent polyoxypropylene glycol,
- 20 percent kaolin, and
- 24 percent attapulgite.

10 days after the initial treatment the plants are again sprayed as indicated above. Sixteen to eighteen weeks after treatment, the suckers from all plants are harvested and wieighed. Data obtained are recorded and percent sucker control is determined by comparison with sucker weights of untreated controls. Maleic hydraxide (170 mg./plant which is the recommended level) is used in these tests for the purpose of comparison, since it is a commercial product used as a desuckering agent for tobacco.

TABLE II

| Percent Sucker Control on Flue-cured Tobacco | | | | |
|---|---|---|---|---|
| Compound | Plots | | | |
| | I | II | III | IV |
| Maleic hydrazide | 88 | 60 | 99 | 83 |
| ethyl ester of 1-(1,2,3,4-tetrahydro-1-naphthyl)-5-imidazolecarboxylic acid·HNO₃ | 93 | 99 | 98 | 92 |

EXAMPLE 3

In these tests field grown burley tobacco, at two separate locations, was topped at about the 21st leaf when the plants had reached the early flowering stage. Each topped plant was then sprayed with 20 parts by volume of aqueous solution containing 340 parts of test compound, formulated as the wettable powder described in Example 2. Only one treatment was used and the test was terminated about 16–18 weeks after treatment. Data are collected and reported as percent sucker control determined by comparison with sucker weights of untreated controls.

TABLE III

| Percent Sucker Control on Burley Tobacco | | |
|---|---|---|
| Compound | Plot | |
| | I | II |
| Maleic hydrazide | 90 | 78 |
| ethyl ester of 1-(1,2,3,4-tetrahydro-1-naphthyl)-5-imidazolecarboxylic acid·HNO₃ | 71 | 100 |

I claim:

1. A method for inhibiting bud growth on plants, trees, and harvested bulbs tubers comprising contacting said plants, trees, harvested bulbs and tubers with a bud growth inhibiting amount of a lower alkyl ester of 1-(1,2,3,4-tetrahydro-1-naphthyl)-5-imidazolecarboxylic acid or the acid addition salt thereof.

2. The method according to claim 1 wherein the lower alkyl ester of 1-(1,2,3,4-tetrahydro-1-naphthyl)-5-imidazole-carboxylic acid or the acid addition salt thereof is applied to topped tobacco plants as a solution in a liquid adjuvant containing from about 100 to about 2,000 ppm. of said compound.

3. The method according to claim 2 wherein said lower alkyl ester is applied as an aqueous solution to said tobacco plants in an amount sufficient to provide from 0.1 to 6.0 pounds per acre of said compound.

4. The method according to claim 3 wherein said solution is applied to the stalk and foliage of said topped tobacco plants from about 1 to about 8 weeks prior to harvesting of the tobacco.

5. The method according to claim 1 wherein the lower alkyl ester of 1-(1,2,3,4-tetrahydro-1-naphthyl)-5-imidazolecarboxylic acid or the acid addition salt therof is applied as an aqueous solution to dormant trees in an amount sufficient to provide from 1.0 to 10.0 pounds per acre of said compound.

6. The method according to claim 1 for inhibiting bud growth on bulbs and tubers comprising applying to said bulbs and tubers a bud growth inhibiting amount of a compound defined in claim 1.

7. The method according to claim 1, wherein the alkyl ester is the ethyl ester of 1-(1,2,3,4-tetrahydrol-1-naphthyl)-5-imidazolecarboxylic acid.

8. The method according to claim 1, wherein the compound is the acid addition salt of the ethyl ester of 1-(1,2,3,4-tetrahydro-1-naphthyl)-5-imidazolecarboxylic acid selected from the group consisting of the hydrochloride, nitrate, gluconate, oxalate, acetate and citrate salts of said compound.

9. The method according to claim 1 wherein the alkyl ester is the methyl ester of 1-(1,2,3,4-tetrahydro-1-naphthyl)-5-imidazolecarboxylic acid.

10. The method according to claim 1 wherein the alkyl ester is the n-butyl ester of 1-(1,2,3,4-tetrahydro-1-naphthyl)-5-imidazolecarboxylic acid.

* * * * *

UNITED STATES PATENT OFFICE
CERTIFICATE OF CORRECTION

Patent No. 3,873,297          Dated March 25, 1975

Inventor(s) Robert Howard Kupelian

It is certified that error appears in the above-identified patent and that said Letters Patent are hereby corrected as shown below:

Column 3, line 1, beginning with "FIG. 1 is a schematic" cancel all to and including "pre-selected level as de-" in column 4, line 67, and insert the matter on the attached sheets.

Signed and Sealed this sixth Day of January 1976

[SEAL]

Attest:

RUTH C. MASON
*Attesting Officer*

C. MARSHALL DANN
*Commissioner of Patents and Trademarks* plants such as fruit and nut trees is achieved by a procedure which differs from both techniques heretofore described. This procedure involves applying an aqueous solution containing the active imidazolecarboxylic acid or acid salt thereof to the branches and trunks of dormant trees where inhibition of adventitious buds is desired. The trees are generally sprayed to run off with the prepared solution about 1 to 5 weeks before silver tips are expected to show, and the application is usually sufficient to provide about 1 to 10 pounds per acre of the active imidazolecarboxylic acid.

In practice we have found that it is generally preferable to formulate the active compound as a 25% to 75% wettable powder formulation which is dispersed in water at the site of use and applied to plants or trees as a liquid spray or to harvested vegetables as a spray or dip.

Wettable powder formulations useful in the practice of this invention can be prepared by grinding together from about 25% to 75% by weight of the active compound; about 15% to 65% of a finely divided solid carrier, such as attaclay, kaolin, diatomaceous earth or talc; about 2% to 5% by weight of a dispersant, such as sodium lignosulfonate; and from about 2% to 5% by weight of a surfactant. Illustrative wettable powder formulations, percentages being by weight, are as follows:

(A)  2% by weight nonylphenol ethyleneoxide
4% nonionic blend (Atlox 895)
20% Kaolinite
24% attapulgite
50% ethyl ester of 1-(1,2,3,4-tetrahydro-1-naphthyl)-5-imidazolecarboxylic acid nitrate salt or (B)  0.5% dioctyl ester of sodium sulfosuccinate 5.0% calcium lignosulfonate 19.0% kaolinite 25% attapulgite 50.0% ethyl ester of 1-(1,2,3,4-tetrahydro-1-naphthyl)
.5-imidazolecarboxylic acid nitrate salt Inhibiting bud development (e.g., sprouting) on harvested bulbs and tubers such as potatoes and onions is achieved by a procedure which is quite different from that described for bud control in tobacco. It involves the rather simple expedient of dipping the harvested vegetables in an aqueous solution containing from about 10 to 1000 ppm of the active imidazolecarboxylic acid or its acid addition salt. Dipping time is generally of the order of 30 to 90 seconds, after which the treated vegetables are dried and stored.

The invention will be illustrated in conjunction with the following examples which are to be taken merely as illustrative and not by way of limitation. All parts are by weight unless otherwise stated.

EXAMPLE 1

Procedure for Tobacco Axillary Bud Inhibitors

Seedling tobacco plants are transplanted into six-inch plastic pots containing a greenhouse soil mix (loam soil:sand:muck 1:1:1). The plants are grown in the greenhouse for eight to ten weeks until they reach the stage just prior to blooming, and then are topped just above the eleventh node. The chemicals to be evaluated as axillary bud inhibitors are applied as a course foliar spray to the entire plant immediately after topping such that the spray solution runs down and into the axils of the leaves contacting the dormant buds. The spray solution is prepared by dissolving the desired amount of the ethyl ester of 1-(1,2,3,4-tetrahydro-1-naphthyl)-5-imidazolecarboxylic acid or its nitrate addition salt in an acetonewater mixture containing 0.5% of polyoxyethylene sorbitan monolaurate. The plant to be sprayed is placed on a turntable and 40 ml. of the spray solution applied to the plant from three directed nozzles. The concentration of chemical in the spray solution varies from 100 ppm. to 1600 ppm. After spraying, the plants are placed at random on the greenhouse bench and watered normally for a period of two weeks. At the termination of each test, the suckers are removed from all nodes, weighed and the results expressed as percent inhibition compared with the fresh weight of suckers from untreated controls. Maleic hydrazide, a commercial bud growth regulant, is included for comparison. From the data obtained and provided in Table I below, it can be seen that the free base and the nitrate salt of the compound hereinabove named is approximately twice as effective as the commercial bud inhibitor maleic hydrazide when used at rates from 100 ppm. to 400 ppm. At higher rates of 800 ppm. and 1600 ppm. the activity of maleic hydrazide is still less than that of the aforementioned compounds.

TABLE I

| Structure | Percent Inhibition | | | | |
|---|---|---|---|---|---|
| | 1600 ppm | 800 ppm | 400 ppm | 200 ppm | 100 ppm |
| [Structure: tetrahydronaphthyl-pyrazole with C₂H₅O-CO substituent · HNO₃] | Test #1: 90<br>Test #2: 100<br>Test #3: 100 | 99 | 93 | 98 | 94 |
| | Test #1: 96<br>Test #2: 94 | 100 | 98 | 88 | 67 |
| Maleic Hydrazide [Structure: pyridazine-3,6-dione] | 100 | 100 | 100 | 91.8 | — |
| [Structure: tetrahydronaphthyl-pyrazole with C₂H₅O-CO substituent] Free base | | 88 | 67 | 66 | 43 |
| | | 93 | 79 | 41 | 39 |
| | | 100 | 89.2 | 82.3 | — |